(12) United States Patent
Wong et al.

(10) Patent No.: US 12,270,471 B2
(45) Date of Patent: Apr. 8, 2025

(54) TRANSMISSION

(71) Applicant: 1783590 Ontario Inc., Toronto (CA)

(72) Inventors: Anthony Wong, Toronto (CA);
Jaroslaw Lutoslawski, Toronto (CA);
Sarah Jean Fondyga, Toronto (CA);
Sergio Mordo, Toronto (CA)

(73) Assignee: 1783590 Ontario Inc., Toronto (CA)

( * ) Notice: Subject to any disclaimer, the term of this patent is extended or adjusted under 35 U.S.C. 154(b) by 0 days.

(21) Appl. No.: 18/027,508

(22) PCT Filed: Sep. 22, 2021

(86) PCT No.: PCT/CA2021/051322
§ 371 (c)(1),
(2) Date: Mar. 21, 2023

(87) PCT Pub. No.: WO2022/061457
PCT Pub. Date: Mar. 31, 2022

(65) Prior Publication Data
US 2023/0375078 A1     Nov. 23, 2023

Related U.S. Application Data

(60) Provisional application No. 63/081,379, filed on Sep. 22, 2020.

(51) Int. Cl.
*F16H 9/24*     (2006.01)

(52) U.S. Cl.
CPC ......... *F16H 9/24* (2013.01); *F16H 2009/245* (2013.01); *F16H 2200/0034* (2013.01)

(58) Field of Classification Search
CPC ..... F16H 9/24; F16H 9/12; F16H 9/06; F16H 7/08; F16H 7/22; F16H 2007/0806;
(Continued)

(56) References Cited

U.S. PATENT DOCUMENTS 3,762,229 A * 10/1973 Johnson .................... F16H 9/06
474/120
4,299,584 A    11/1981 Sproul
(Continued)

FOREIGN PATENT DOCUMENTS

DE     3741860     6/1989
EP     0053954     6/1982
(Continued)

OTHER PUBLICATIONS

Written Opinion received for International Patent Application No. PCT/CA2021/051322, dated Dec. 9, 2021.
(Continued)

*Primary Examiner* — Michael R Mansen
*Assistant Examiner* — Katelynne R Burrell
(74) *Attorney, Agent, or Firm* — Faegre Drinker Biddle & Reath LLP

(57) ABSTRACT

A transmission is provided comprising: a first pulley assembly rotatable about a first axis; a second pulley assembly rotatable about a second axis; an endless member coupling the first pulley assembly and the second pulley assembly; an idler pulley engaging the endless member and rotatable about an idler axis, the idler pulley being movable between a first position and a second position; a tensioner assembly coupled to the idler pulley, configured to control tension in the endless member and comprising: a tensioner spring having a spring axis and biasing the idler pulley towards the second position; and a tensioner arm rotatable about a tensioner axis and coupling the tensioner spring to the idler pulley, the tensioner arm defining a spring linkage extending between the tensioner axis and a spring coupling point, wherein a spring angle is defined between the spring axis and the spring linkage.

18 Claims, 7 Drawing Sheets

(58) Field of Classification Search
CPC ..... F16H 2007/0893; F16H 2007/0846; F16H 2007/0887; F16H 2007/0861; F16H 7/1281; F16H 7/1218; F16H 7/129; F16H 2009/245; F16H 2200/0034
USPC .......................................................... 474/135
See application file for complete search history.

(56) References Cited

U.S. PATENT DOCUMENTS

| | | | |
|---|---|---|---|
| 5,120,277 A | 6/1992 | Georget | |
| 5,141,475 A * | 8/1992 | Sajczvk | F16H 7/1218 |
| | | | 474/135 |
| 5,240,461 A | 8/1993 | Hohnl | |
| 5,383,813 A | 1/1995 | Odai | |
| 6,162,141 A * | 12/2000 | Rointru | F16H 7/1209 |
| | | | 474/190 |
| 6,899,650 B2 | 5/2005 | Okuda | |
| 8,568,259 B2 | 10/2013 | Robbins | |
| 8,753,236 B2 | 6/2014 | Wong | |
| 9,334,932 B2 * | 5/2016 | Antchak | F16H 7/1281 |
| 9,816,598 B2 | 11/2017 | Wong | |
| 10,054,200 B2 * | 8/2018 | Aubertin | F16H 7/1281 |
| 10,619,712 B2 * | 4/2020 | Kwon | F16H 7/1281 |
| 10,626,960 B2 * | 4/2020 | Kwon | F02B 67/06 |
| 12,071,200 B2 * | 8/2024 | Hacking | B62M 9/16 |
| 2004/0166975 A1 | 8/2004 | Gibson | |
| 2005/0261094 A1 * | 11/2005 | Foster | F16H 7/1236 |
| | | | 474/101 |
| 2008/0207367 A1 | 8/2008 | Bogner | |
| 2012/0318589 A1 * | 12/2012 | Staley | F16H 7/1281 |
| | | | 474/134 |
| 2015/0057117 A1 | 2/2015 | Antchak | |
| 2017/0138445 A1 * | 5/2017 | Farewell | F16H 7/1281 |
| 2018/0003272 A1 | 1/2018 | Herrala | |
| 2018/0209516 A1 * | 7/2018 | Lapp | F16H 7/0848 |
| 2019/0203812 A1 * | 7/2019 | Veer | F16H 7/06 |
| 2021/0131530 A1 * | 5/2021 | Quintanilla Salas | A01D 34/76 |

FOREIGN PATENT DOCUMENTS

| | | |
|---|---|---|
| EP | 1460307 | 9/2004 |
| EP | 1921345 | 5/2008 |
| JP | 3729627 | 12/2005 |
| WO | 2005111463 | 11/2005 |
| WO | 2010054928 | 5/2010 |
| WO | 2019173896 | 9/2019 |
| WO | 2020223786 | 11/2020 |
| WO | 2020223787 | 11/2020 |
| WO | 2020252558 | 12/2020 |

OTHER PUBLICATIONS

International Search Report received for International Patent Application No. PCT/CA2021/051322, dated Jan. 13, 2022.

* cited by examiner

TRANSMISSION

CROSS-REFERENCE TO RELATED APPLICATION

This application claims the benefit of U.S. Provisional Patent Application No. 63/081,379 filed on Sep. 22, 2020, and titled TRANSMISSION, the entirety of which is incorporated herein by reference.

FIELD

The subject disclosure generally relates to transmissions, and more particularly to a transmission with a tensioner assembly and/or an idler lock.

BACKGROUND

Transmissions are well known and can be used to change the ratio between rotating elements. Potential applications for transmissions are numerous and include motor vehicles, human-powered vehicles, maritime craft and heavy machinery, such as pumps, turbines, mixers, winches, centrifuges and shredders.

Clutchless multi-ratio transmissions allow the ratio between rotating elements to be changed while the transmission is under load. Certain mechanical problems can affect clutchless multi-ratio transmissions that limit their widespread utilization; specifically, the ability of such transmission systems to function at high speeds or under significant loads effectively and efficiently in practical applications. In addition, ratcheting, slippage, and tensioning problems can limit the commercial viability of such transmissions by decreasing their reliability, decreasing their efficiency and increasing wear. Accordingly, synchronized segmentally interchanging pulley transmission systems (SSIPTS) have been developed to reduce or alleviate at least some of these mechanical problems.

For example, U.S. Pat. No. 8,753,236 to Wong et al. discloses an SSIPTS, wherein a pulley assembly is mounted on an axle. The pulley assembly includes a core pulley having a first set of mating features on a peripheral surface thereof and a pulley segment set that comprises a number of pulley segments slidably mounted in the pulley assembly and arranged in a ring concentric with the core pulley. The pulley segments are individually actuatable into and out of the pulley assembly. The pulley segments have a second set of mating features on a peripheral surface matching the first set of mating features. An endless drive member has corresponding mating features on an inside surface for engaging the first and second sets of mating features of the core pulley and the pulley segments in an engaging position. Contact between the endless drive member and the core pulley defines a contact zone. An actuator actuates the pulley segments between the engaging and non-engaging positions when the pulley segments are outside of the contact zone.

U.S. Pat. No. 9,816,598 to Wong discloses a key pulley segment for an SSIPTS that is either first or last in a pulley segment set to engage an endless member. The first or last key segment teeth to engage or disengage the endless member, respectively, are shortened or completely trimmed, and the adjacent pulley segment to the key segment is elongated such that a portion of the tooth profile extends toward the key segment. The shortened tooth or teeth and elongated adjacent segment together allow for many pulley segments to be designed as key segments. Completely trimmed teeth may be engineered to create a supporting surface for the endless member on the key segment. The elongated adjacent segment may have an extending portion which slidably mates with the supporting surface of the key segment, thereby receiving radial support therefrom. Multiple pulley segments from different pulley segment sets may be connected or constructed to move together in a unified stack. Unified stacks may be moved by way of a cam or roller-cam system. Chassis-mounted cams engage the rollers outside of the contact zone and, via roller-arms, individual segments of a unified stack are moved into or out of engagement. Rollers may be actuated into and out of engagement with the cams by electromagnets, fixably mounted in an array.

PCT International Application Publication No. 2019/173896 to Wong discloses a pulley assembly for engaging an endless member. The pulley assembly includes a first pulley, a second pulley and at least one transition segment set comprising one or more transition segments that are independently movable between an engaged region and a disengaged region to transition the endless member between the first pulley and the second pulley. An actuator system is also disclosed. The actuator system includes a support structure, an actuator subassembly secured to the support structure and a stator. The actuator subassembly includes a follower and a sled, which is movable in a circumferential direction between an advanced position and a retreated position, in response to an electromotive force generated on the sled by the stator. The follower engages the cam surface of the sled to move in an axial direction between an extended position and a retracted position as the sled moves between the advanced and retreated positions.

While the contributions of known segmented pulley transmissions are laudable, improvements and alternatives are generally desired. It is therefore an object to provide a novel pulley transmission.

This background serves only to set a scene to allow a person skilled in the art to better appreciate the following detailed description. None of the above discussion should necessarily be taken as an acknowledgment that this discussion is part of the state of the art or is common general knowledge.

SUMMARY

It should be appreciated that this summary is provided to introduce a selection of concepts that are further described below in the detailed description of embodiments. This summary is not intended to be used to limit the scope of the claimed subject matter.

Accordingly, in an aspect, there is provided a transmission comprising: a first pulley assembly rotatable about a first axis; a second pulley assembly spaced apart from the first pulley assembly and rotatable about a second axis; an endless member extending between and rotationally coupling the first pulley assembly and the second pulley assembly; an idler pulley engaging the endless member and rotatable about an idler axis, the idler pulley being movable between at least a first position and a second position; and a tensioner assembly coupled to the idler pulley and configured to control tension in the endless member, the tensioner assembly comprising: a tensioner spring having a spring axis and biasing the idler pulley towards the second position; and a tensioner arm rotatable about a tensioner axis and coupling the tensioner spring to the idler pulley, the tensioner arm defining a spring linkage that extends between the tensioner axis and a spring coupling point, where the tensioner spring is coupled to the tensioner arm, and further defining an idler linkage that extends between the tensioner axis and an idler coupling point, where the idler pulley is coupled to the tensioner arm, wherein a spring angle is defined between the spring axis and the spring linkage.

In one or more embodiments, the tensioner assembly can be configured to provide generally constant tension in the endless member as the idler pulley moves between the second position and the first position. Alternatively, the tensioner assembly can be configured to provide decreased tension in the endless member as the idler pulley moves from the second position to the first position.

In one or more embodiments, a spring force applied by the tensioner spring to the tensioner arm can change as the idler pulley moves from the second position to the first position, and the spring angle can change as the idler pulley moves from the second position to the first position to at least partially counteract the change in the spring force.

In one or more embodiments, a spring force applied by the tensioner spring to the tensioner arm can increases as the idler pulley moves from the second position to the first position, and the spring angle can approach parallel as the idler pulley moves from the second position to the first position to at least partially counteract the increase in the spring force. The spring angle can approach parallel by increasing as the idler pulley moves from the second position to the first position. The tensioner spring can be a coil spring that is compressed to increase the spring force as the idler pulley moves from the second position to the first position.

In one or more embodiments, the spring angle can be in the range of about 150 degrees to about 185 degrees when idler pulley is in the first position and can be in the range of about 110 degrees to about 140 degrees when the idler pulley is in the second position. In some embodiments, the spring angle can be in the range of about 160 degrees to about 170 when idler pulley is in the first position and can be in the range of about 120 degrees to about 130 degrees when the idler pulley is in the second position. In some embodiments, the spring angle can be about 165 degrees when the idler pulley is in the first position and can be about 125 degrees when the idler pulley is in the second position.

In one or more embodiments, the tensioner arm can be rigid and an arm angle defined between the spring linkage and the idler linkage can be fixed. The tensioner arm can be a generally L-shaped, wherein the idler coupling point is located at one end of the L-shape, wherein the spring coupling point is located at the other end of the L-shape, and wherein the tensioner axis is located at an elbow of the L-shape. The idler linkage can be longer than the spring linkage.

In one or more embodiments, the transmission can further comprise an idler lock that is movable between an unlocked position and a locked position, wherein the idler lock secures the idler pulley in the second position when the idler lock is in the locked position, and wherein the idler lock does not secure the idler pulley in the second position when the idler lock is in the unlocked position. The idler lock can be configured to automatically release the idler pulley when tension in the endless member exceeds a threshold. The idler lock can comprise a locking surface for engaging the idler pulley when the idler pulley is in the second position, and can further comprise an idler lock spring that biases the idler lock towards the locked position. The locking surface can be defined by a plane that forms an angle $\Omega$ with the idler linkage, and the angle $\Omega$ and the idler lock spring can be configured to automatically release the idler pulley when tension in the endless member exceeds the threshold. The idler lock can comprise a cam surface that engages the idler pulley and deflects the idler lock out of the locked position as the idler pulley moves from the first position to the second position. The transmission can further comprise an idler lock actuator for selectively moving the idler lock between the locked position and the unlocked position.

In another aspect, there is provided a transmission comprising: a first pulley assembly rotatable about a first axis; a second pulley assembly spaced apart from the first pulley assembly and rotatable about a second axis; an endless member extending between and rotatably coupling the first pulley assembly and the second pulley assembly; an idler pulley engaging the endless member and rotatable about an idler axis, the idler pulley being movable between at least a first position and a second position; and an idler lock that is movable between an unlocked position and a locked position, wherein the idler lock secures the idler pulley in the second position when the idler lock is in the locked position, and wherein the idler lock does not secure the idler pulley in the second position when the idler lock is in the unlocked position.

In one or more embodiments, the idler lock can comprise a locking surface for engaging the idler pulley when the idler pulley is in the second position, and further can further comprise an idler lock spring that biases the idler lock towards the locked position. The idler lock can be configured to automatically release the idler pulley when tension in the endless member exceeds a threshold. The locking surface can be defined by a plane at an angle $\Omega$, and the angle $\Omega$ and the idler lock spring can be configured to automatically release the idler pulley when tension in the endless member exceeds the threshold.

In some embodiments, the transmission can further comprise a tensioner assembly coupled to the idler pulley and configured to control tension in the endless member, the tensioner assembly comprising: a tensioner spring biasing the idler pulley towards the second position; and a tensioner arm rotatable about a tensioner axis and coupling the tensioner spring to the idler pulley, the tensioner arm defining a spring linkage that extends between the tensioner axis and a spring coupling point, where the tensioner spring is coupled to the tensioner arm, and further defining an idler linkage that extends between the tensioner axis and an idler coupling point, where the idler pulley is coupled to the tensioner arm. The angle $\Omega$ can be defined between the plane of the locking surface and the idler linkage. In other embodiments, the transmission can comprise a tensioner assembly coupled to the idler pulley and configured to bias the idler pulley towards the second position.

In one or more embodiments, the idler lock can comprise a cam surface that engages the idler pulley and deflects the idler lock out of the locked position as the idler pulley moves from the first position to the second position.

In one or more embodiments, the transmission can further comprise an idler lock actuator for selectively moving the idler lock between the locked position and the unlocked position.

In one or more embodiments, the transmission can further comprise an idler stop to arrest movement of the idler pulley as the idler pulley reaches the first position. The idler stop can comprise an engagement surface that abuts the idler pulley as the idler pulley reaches the first position, and the engagement surface can bias the idler pulley away from the tensioner axis when the idler pulley is in the first position.

In one or more embodiments, the second pulley assembly can comprise an inner pulley and at least one segmented pulley concentrically surrounding the inner pulley. The first pulley assembly can be a single fixed pulley.

In one or more embodiments, the transmission can further comprise a housing at least partially supporting one or more of the first pulley assembly, the second pulley assembly, the endless member, the idler pulley, the tensioner assembly and the idler lock, and the housing can be one of a casing and a support structure.

BRIEF DESCRIPTION OF THE DRAWINGS

Embodiments will now be described more fully with reference to the accompanying drawings, in which.

DETAILED DESCRIPTION OF EMBODIMENTS

Figure 1:
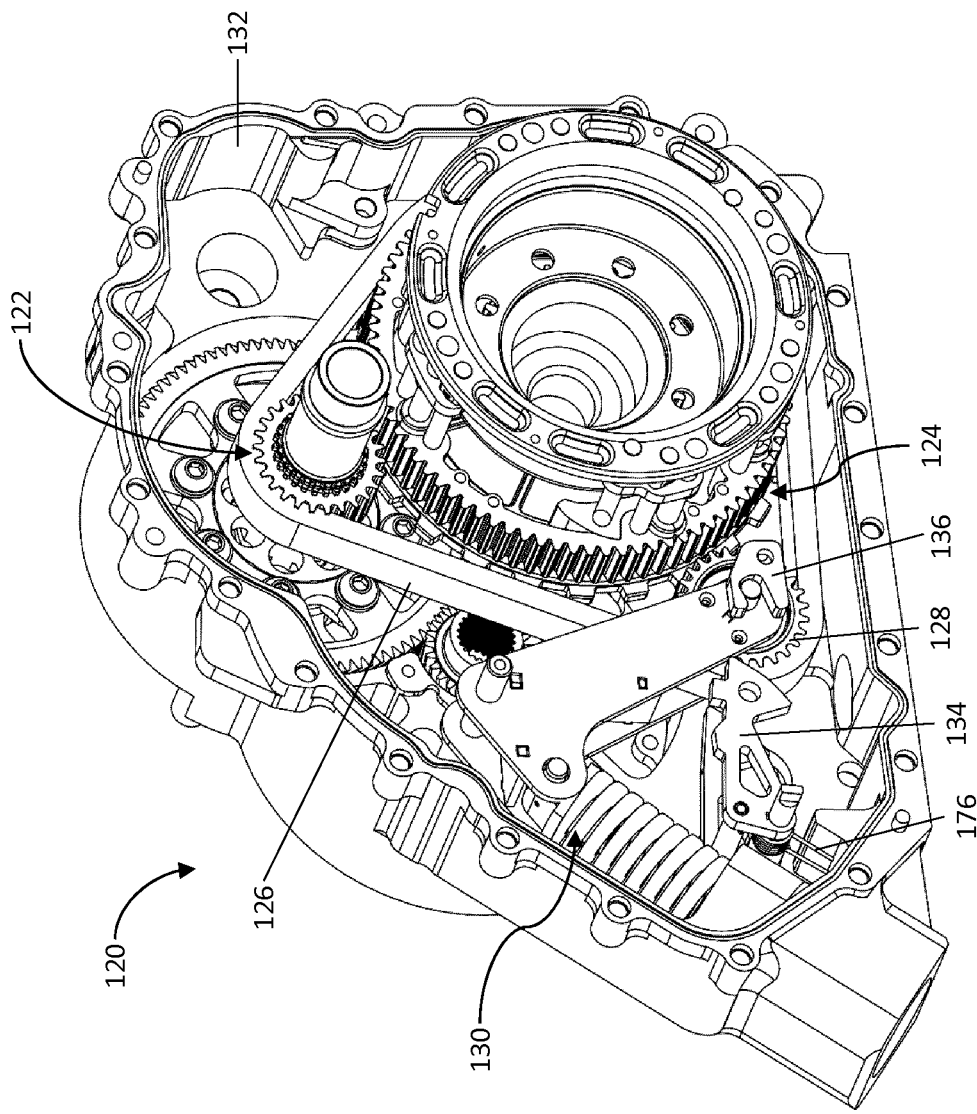
FIG. 1 is a cross-sectional axonometric view of a transmission, in a first gear.
Figure 2:
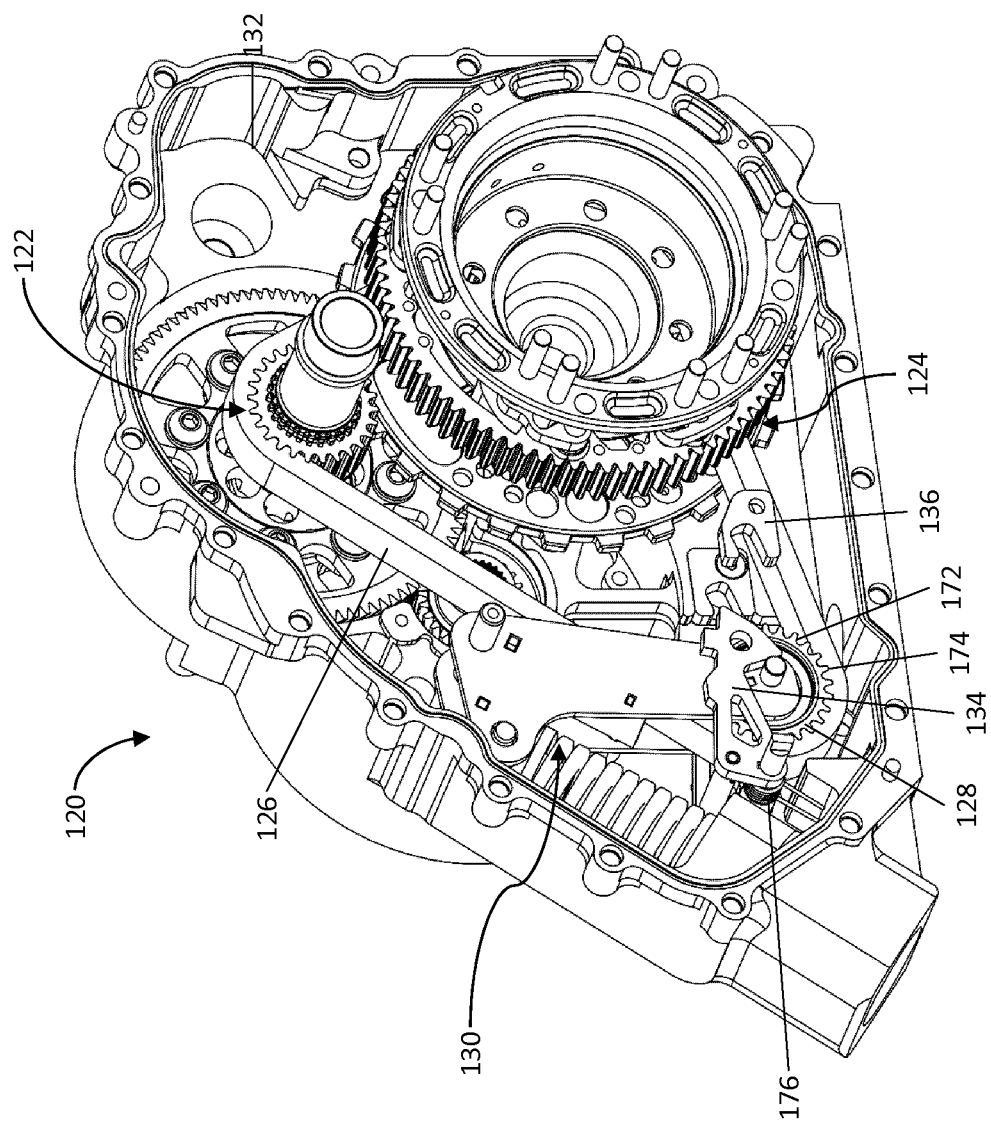
FIG. 2 is a cross-sectional axonometric view of the transmission of FIG. 1, in a second gear.

The foregoing summary, as well as the following detailed description of certain embodiments will be better understood when read in conjunction with the accompanying drawings. As used herein, an element or feature described in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the described elements or features of that one example or one embodiment. Moreover, unless explicitly stated to the contrary, examples or embodiments "comprising," "having" or "including" an element or feature or a plurality of elements or features having a particular property may further include additional elements or features not having that particular property. Also, it will be appreciated that the terms "comprises," "has" and "includes" mean "including but not limited to" and the terms "comprising," "having" and "including" have equivalent meanings.

As used herein, the term "and/or" can include any and all combinations of one or more of the associated listed elements or features.

It will be understood that when an element or feature is referred to as being "on," "attached" to, "connected" to, "coupled" with, "contacting," etc. another element or feature, that element or feature can be directly on, attached to, connected to, coupled with or contacting the other element or feature or intervening elements may also be present. In contrast, when an element or feature is referred to as being, for example, "directly on," "directly attached" to, "directly connected" to, "directly coupled" with or "directly contacting" another element of feature, there are no intervening elements or features present.

It will be understood that spatially relative terms, such as "under," "below," "lower," "over," "above," "upper," "front," "back" and the like, may be used herein for ease of describing the relationship of an element or feature to another element or feature as depicted in the figures. The spatially relative terms can, however, encompass different orientations in use or operation in addition to the orientation depicted in the figures.

Reference herein to "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to." Thus, "configured" means that the element or feature is designed and/or intended to perform a given function and should not be construed to mean that a given element or feature is simply capable of performing a given function.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately," "substantially," "generally" and "about" represent an amount or condition close to the stated amount or condition that results in the desired function being performed or the desired result being achieved. For example, the terms "approximately," "substantially," "generally" and "about" may refer to an amount that is within engineering tolerances to the precise value or condition specified that would be readily appreciated by a person skilled in the art.

FIGS. 1 to 6 show a transmission, generally identified by reference character 120. In the subject embodiment, the transmission 120 is a segmented pulley transmission and more particularly a synchronized segmentally interchanging pulley transmission system (SSIPTS). As will be appreciated, a portion of a housing of the transmission 120 has been omitted in FIGS. 1 and 2 to view an interior of the transmission 120 and further elements have been omitted in FIGS. 3 to 6 to provide a simplified view of the transmission 120. In some embodiments, the transmission 120 may include elements shown and described in PCT International Application Nos. PCT/CA2018/051475, PCT/CA2019/051712, PCT/CA2019/051713 and/or PCT/CA2019/051714, the relevant portions of all of which are incorporated herein by reference.

The transmission 120 is configured to rotationally couple a first rotating element and a second rotating element (neither shown) and is configured to change a rotation ratio between the first and second rotating elements. In some embodiments, the first rotating element may be a driving axle of a power train and the second rotating element may be a driven axle, or vice versa. The transmission 120 comprises a first pulley assembly 122, a second pulley assembly 124, an endless member 126, an idler pulley 128, a tensioner assembly 130 and a housing 132. The transmission 120 further comprises an idler lock 134 and an idler stop 136. In some embodiments, the transmission 120 may further comprise an actuator (not shown) for moving segments of a segmented pulley between an engaged region and a disengaged region as described herein, such as the actuators described in PCT International Application Nos. PCT/CA2018/051475 and/or PCT/CA2019/051713, the relevant portions of both of which are incorporated herein by reference.

In brief, the first pulley assembly 122 is spaced apart from the second pulley assembly 124. The endless member 126 rotationally couples the first and second pulley assemblies 122, 124. The idler pulley 128 engages the endless member 126, and the tensioner assembly 130 is coupled to and moves the idler pulley 128 to control tension in the endless member 126. The housing 132 at least partially surrounds and supports one or more of the first pulley assembly 122, the second pulley assembly 124, the endless member 126, the idler pulley 128 and the tensioner assembly 130. During operation of the transmission 120, the first pulley assembly 122 is coupled to the first rotating element and the second pulley assembly 124 is coupled to the second rotating element, such that rotation of the first rotating element causes rotation of the second rotating element, or vice versa, at a rotation ratio of the transmission, which can be adjusted as described herein. In embodiments where the first rotating element is the driving axle and the second rotating element is the driven axle, the first pulley assembly 122 can be described as a driving pulley assembly and the second pulley assembly 124 can be described as a driven pulley assembly. In the subject embodiment, the first pulley assembly 122, the second pulley assembly 124 and the idler pulley 128 all rotate in a counter-clockwise direction as viewed in FIGS. 1 to 6 during forward operation of the transmission 120. During reverse operation of the transmission 120 in the subject embodiment, the first pulley assembly 122, the second pulley assembly 124 and the idler pulley 128 all rotate in a clockwise direction as viewed in FIGS. 1 to 6.

The first pulley assembly 122 is configured to be coupled to the first rotating element (not shown), such as by screws, bolts, a slotted shaft, a key and keyway or other suitable coupling mechanisms. The first pulley assembly 122 is configured to rotate during operation of the transmission 120. The first pulley assembly 122 is concentric with and rotatable about a first axis 140 (shown in FIG. 3). The first pulley assembly 122 comprises a single fixed pulley 142. The fixed pulley 142 includes an outer peripheral surface 144 for engaging the endless member 126. The outer peripheral surface 144 is generally circular and may include a plurality of mating features 146, such as teeth, for engaging corresponding mating features on the endless member 126.

The second pulley assembly 124 is configured to be coupled to the second rotating element (not shown). The second pulley assembly 124 is configured to rotate during operation of the transmission 120. The second pulley assembly 124 is spaced apart from the first pulley assembly 122 and is rotatable about a second axis 150 (shown in FIG. 3). The second pulley assembly 124 comprises an inner pulley 152 and an outer, segmented pulley 154. The segmented pulley 154 is concentric with the inner pulley 152. The segmented pulley 154 can selectively surround the inner pulley 152 during operation of the transmission 120 to engage the endless member 126 and change the rotation ratio of the transmission 120.

The inner pulley 152 is configured to be coupled to the second rotating element, such as by screws, bolts, a slotted shaft, a key and keyway or other suitable coupling mechanisms. The inner pulley 152 is rotatable about and concentric with the second axis 150. The inner pulley 152 is configured to engage the endless member 126. The inner pulley 152 includes an outer peripheral surface 156 for engaging the endless member 126. The outer peripheral surface 156 is generally circular and may include a plurality of mating features 158, such as teeth, for engaging corresponding mating features on the endless member 126. The inner pulley 152 is a core pulley of the second pulley assembly 124. That is, the inner pulley 152 is the centermost or smallest diameter pulley in the second pulley assembly 124.

The segmented pulley 154 is configured to be coupled to the second rotating element via at least one of connecting rods, a backing plate, a hub, an actuator, and other suitable coupling mechanisms, such as those described in PCT International Application Nos. PCT/CA2018/051475, PCT/CA2019/051712, PCT/CA2019/051713 and/or PCT/CA2019/051714, the relevant portions of all of which are incorporated herein by reference. The segmented pulley 154 is rotatable about and concentric with the second axis 150. The segmented pulley 154 is configured to engage the endless member 126. The segmented pulley 154 includes an outer peripheral surface 160 for engaging the endless member 126. The outer peripheral surface 160 is generally circular and may include a plurality of mating features 162, such as teeth, for engaging corresponding mating features on the endless member 126. The segmented pulley 154 comprises a plurality of pulley segments 164. The plurality of pulley segments 164 is circularly arranged to form the segmented pulley 154.

The plurality of pulley segments 164 is configured to engage the endless member 126. Each of the pulley segments 164 includes a body that defines a portion of the outer peripheral surface 160 of the segmented pulley 154. The plurality of pulley segments 164 may be the same as those described in PCT International Application No. PCT/CA2019/051712, the relevant portions of which are incorporated herein by reference. The plurality of pulley segments 164 are configured to be sequentially movable between an engaged region and a disengaged region to transition the endless member 126 between the inner pulley 152 and the segmented pulley 154. In the subject embodiment, the plurality of pulley segments 164 are individually movable between the engaged region and the disengaged region. The plurality of pulley segments 164 can be moved between the engaged region and the disengaged region by one or more actuators, such as those described in PCT International Application Nos. PCT/CA2018/051475 and/or PCT/CA2019/051713, the relevant portions of both of which are incorporated herein by reference.

In the context of the subject disclosure, the "engaged region" is a region wherein elements of the second pulley assembly 124 will engage the endless member 126 during rotational operation of the second pulley assembly 124, when those elements are not surrounded or sheltered from the endless member 126 by other elements of the transmission 120. In contrast, the "disengaged region" is a region wherein elements of the second pulley assembly 124 will not engage the endless member 126 during rotational operation of the second pulley assembly 124, regardless of their exposure or the position of the other elements of the transmission 120. In the subject embodiment, it will be appreciated that the inner pulley 152 is permanently located within the engaged region, as the inner pulley 152 will always engage the endless member 126 when the inner pulley 152 is not surrounded or sheltered by the plurality of pulley segments 164 of the segmented pulley 154. In contrast, the plurality of pulley segments 164 will only be located in the engaged region when moved into a plane defined by the endless member 126. Once all of the pulley segments 164 are moved into the engaged region, the segmented pulley 154 surrounds and shelters the inner pulley 152 from the endless member 126, such that the endless member 126 engages the segmented pulley 154 and does not engage the inner pulley 152 during rotational operation of the second pulley assembly 124.

The endless member 126 is configured to rotationally couple the first pulley assembly 122 and the second pulley assembly 124. The endless member 126 extends between the first pulley assembly 122 and the second pulley assembly 124. The endless member 126 includes an inner surface 166 that is configured to engage at least the first pulley assembly 122 and the second pulley assembly 124. In FIGS. 1 to 6, the endless member 126 is shown as a schematic representation without any mating features. However, as will be appreciated, the endless member 126 can include corresponding mating features, such as complimentary teeth and/or holes, for engaging the mating features 146, 158, 162 of the first and second pulley assemblies 122, 124. As will be appreciated, the endless member 126 may comprise a chain, a belt or other suitable type of endless member.

The idler pulley 128 is rotatable about an idler axis 170. The idler pulley 128 is configured to engage the endless member 126. The idler pulley 128 includes an outer peripheral surface 172 for engaging the endless member 126. The outer peripheral surface 172 is generally circular and may include a plurality of mating features 174, such as teeth, for engaging the corresponding mating features on the endless member 126. The idler pulley 128 is movable between a first position 180 (shown in FIG. 3) and a second position 182 (shown in FIG. 5).

The tensioner assembly 130 is configured to move the idler pulley 128 between the first position 180 and the second position 182. Moving the idler pulley 128 between the first position 180 and the second position 182 can be used to control tension in the endless member 126 as described below. The tensioner assembly 130 biases the idler pulley 128 towards the second position 182. The tensioner assembly 130 comprises a tensioner spring 184 and a tensioner arm 186.

Figure 3:
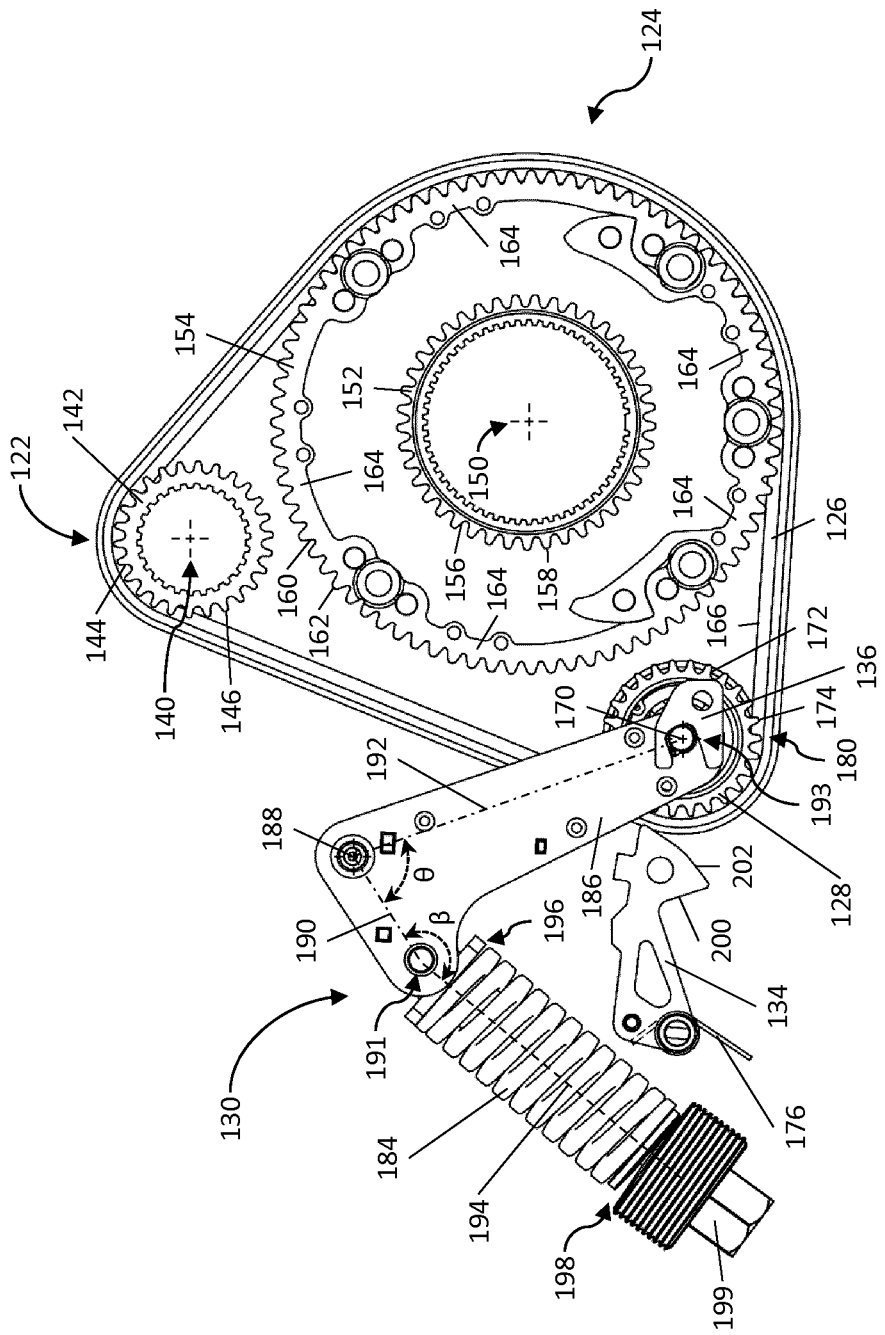
FIG. 3 is a simplified front view of the transmission of FIG. 1, in the first gear.

The tensioner arm 186 is rotatable about a tensioner axis 188. The tensioner arm 186 couples the tensioner spring 184 to the idler pulley 128. The tensioner arm 186 defines a spring linkage 190. The spring linkage 190 extends between the tensioner axis 188 and a spring coupling point 191, where the tensioner spring 184 is coupled to the tensioner arm 186. The tensioner arm 186 further defines an idler linkage 192. The idler linkage 192 extends between the tensioner axis 188 and an idler coupling point 193, where the idler pulley 128 is coupled to the tensioner arm 186. The idler linkage 192 can be longer than the spring linkage 190, as shown in FIG. 3. The tensioner arm 186 is substantially rigid and defines a fixed arm angle θ between the spring linkage 190 and the idler linkage 192. The tensioner arm 186 is generally L-shaped. The spring coupling point 191 is located at one end of the L-shape, such as at the short end of the L-shape. The idler coupling point 193 is located at the other end of the L-shape, such as at the long end of the L-shape. The tensioner axis 188 is located at an elbow of the L-shape, between the spring linkage 190 and the idler linkage 192.

The tensioner spring 184 is configured to bias the idler pulley 128 towards the second position 182, via the tensioner arm 186. As shown in FIG. 3, the tensioner spring 184 applies a spring force to the tensioner arm 186 that generates clockwise torque on the tensioner arm 186 and biases the idler pulley 128 towards the second position 182 (shown in FIG. 5). The tensioner spring 184 is under compression to generate the spring force. The tensioner spring 184 defines a spring axis 194 that extends in a direction of the spring force. In the subject embodiment, the spring axis 194 is a longitudinal axis of the tensioner spring 184. The tensioner spring 184 is a coil spring that extends from a proximal end 196, which is coupled to the tensioner arm 186, to an opposing distal end 198, which is coupled to the housing 132. In the subject embodiment, the distal end 198 of the tensioner spring 184 is coupled to an adjustment screw 199 that forms part of the housing 132.

A spring angle β is defined between the spring axis 194 and the spring linkage 190. As can be seen from FIGS. 3 to 5, the spring angle β varies as the idler pulley 128 moves between the first position 180 and the second position 182. As the spring angle β approaches perpendicular, i.e. approaches 90 degrees, a component of the spring force that contributes to clockwise torque on the tensioner arm 186 increases. Thus, as the spring angle β approaches perpendicular, the component of the spring force that contributes to biasing the idler pulley 128 towards the second position 182 increases. Conversely, as the spring angle β approaches parallel, i.e. approaches 180 degrees, the component of the spring force that contributes to clockwise torque on the tensioner arm 186 decreases. Thus, as the spring angle β approaches parallel, the component of the spring force that contributes to biasing the idler pulley 128 towards the second position 182 decreases. As shown in FIGS. 3 and 5, the spring angle β approaches perpendicular as the idler pulley 128 moves from the first position 180 to the second position 182, and the spring angle β approaches parallel as the idler pulley 128 moves from the second position 182 to the first position 180. That is, in the subject embodiment, the spring angle β decreases as the idler pulley 128 moves from the first position 180 to the second position 182. Conversely, in the subject embodiment, the spring angle β increases as the idler pulley 128 moves from the second position 182 to the first position 180. In the subject embodiment, the spring angle β is about 165 degrees when the idler pulley 128 is in the first position 180, and the spring angle β is about 125 degrees when the idler pulley 128 is in the second position 182. In other embodiments, the spring angle β may be in the range of about 150 degrees to about 185 degrees when the idler pulley 128 is in the first position 180, and the spring angle β may be in the range of about 110 degrees to about 140 degrees when the idler pulley 128 is in the second position 182. In other embodiment, the spring angle β may be in the range of about 160 degrees to about 170 degrees when the idler pulley 128 is in the first position 180, and the spring angle β may be in the range of about 120 degrees to about 130 degrees when the idler pulley 128 is in the second position 182.

The housing 132 at least partially surrounds and at least partially supports, directly or indirectly, one or more of the first pulley assembly 122, the second pulley assembly 124, the endless member 126, the idler pulley 128 and the tensioner assembly 130. In the subject embodiment, the housing 132 is a generally closed casing. Although, in other embodiments, the housing 132 can be a generally open support structure, such as a supportive frame.

During operation of the transmission 120, the endless member 126 will contact and engage the second pulley assembly 124 within an angular region defined as the contact zone. Conversely, the endless member 126 will not contact or engage the second pulley assembly 124 within an angular region defined as the non-contact zone ("NCZ", shown in FIG. 5). Accordingly, the pulley segments 164 of the segmented pulley 154 can be moved into or out of the engaged region while positioned in the non-contact zone without interfering with the endless member 126 and without unloading the transmission 120. As will be appreciated, the non-contact zone will vary depending on which, if any, of the pulley segments 164 are engaged with the endless member 126.

By sequentially moving the pulley segments 164 into or out of the engaged region while positioned in the non-contact zone, the endless member 126 can be transitioned from engaging the inner pulley 152 of the second pulley assembly 124 to engaging the segmented pulley 154 of the second pulley assembly 124, or vice versa. Transition the endless member 126 between the inner pulley 152 and the segmented pulley 154 is referred to as a "shift" or a "shift event." Further description of the sequence for transitioning the endless member 126 from engaging the inner pulley 152 to engaging the segmented pulley 154 can be found in PCT International Application Nos. PCT/CA2018/051475, PCT/CA2019/051712, and/or PCT/CA2019/051713, the relevant portions of which are all incorporated herein by reference. In the subject embodiment, the transmission 120 is in a first gear ("LO gear") when the endless member 126 is engaged with the segmented pulley 154, and the transmission 120 is in a second gear ("HI gear") when the endless member 126 is engaged with the inner pulley 152.

As the transmission 120 shifts from the first gear to the second gear, slack will develop in the endless member 126 if not controlled. That is, as the endless member 126 transitions from engaging the segmented pulley 154 to engaging the inner pulley 152, tension in the endless member 126 will decreases due to the reduction in diameter of the pulleys 152, 154 and slack will develop if not taken up. If excess slack develops, the endless member 126 may become misaligned with the first pulley assembly 122, the second pulley assembly 124 and/or the idler pulley 128, which may decrease performance of the transmission 120, such as the efficiency of the transmission 120. Accordingly, to maintain desired performance of the transmission 120, tension must be controlled in the endless member 126 as the transmission 120 shifts between first gear and second gear. As will be appreciated, tension and slack in the endless member 126 are correlated. Accordingly, taking up slack in the endless member 126 and/or providing slack to the endless member 126 can be used to control tension in the endless member 126. In the subject embodiment, slack must be taken up as the transmission 120 shifts from the first gear to the second gear to maintain tension. Conversely, as the transmission 120 shifts from the second gear to the first gear, slack must be provided to the endless member 126 to maintain tension.

Figure 4:
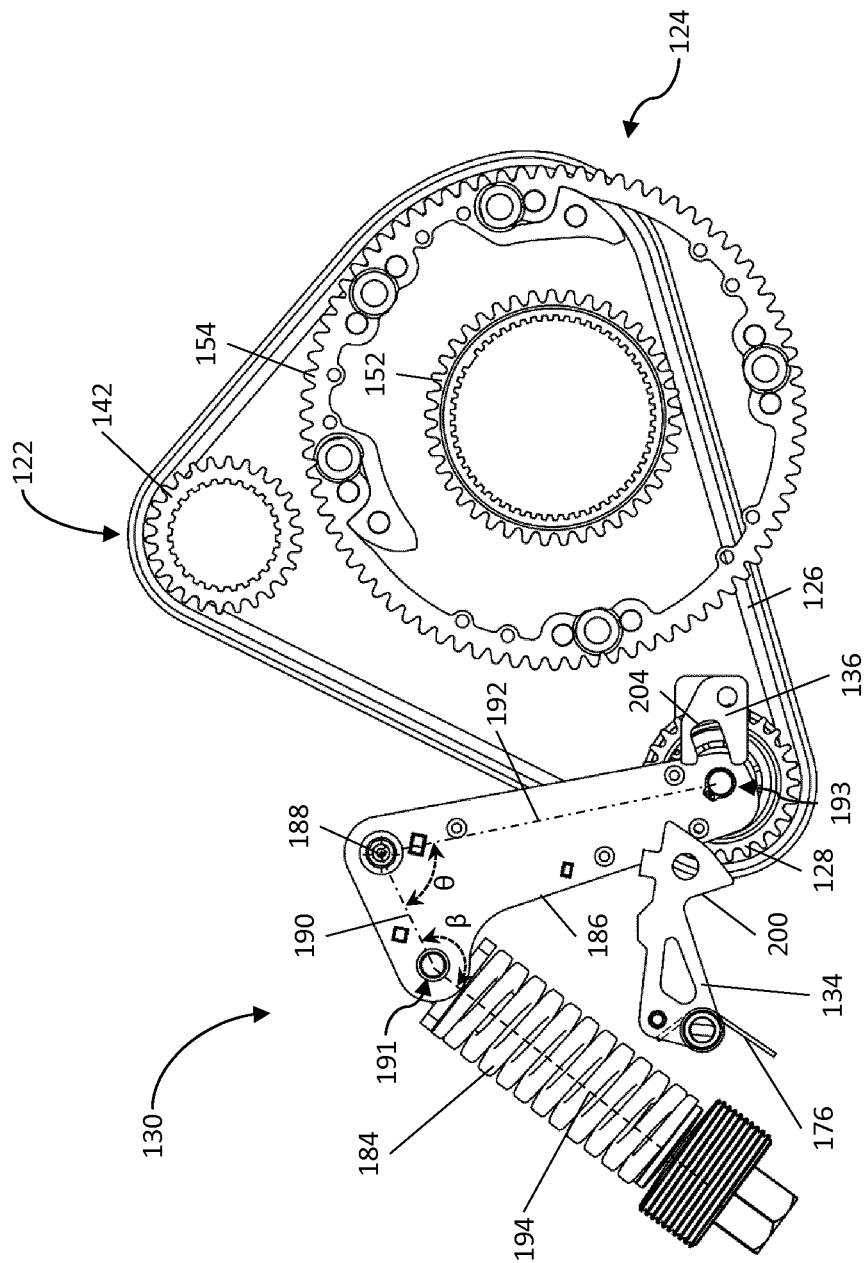
FIG. 4 is a simplified front view of the transmission of FIG. 1, in a transition from the first gear to the second gear.
Figure 5:
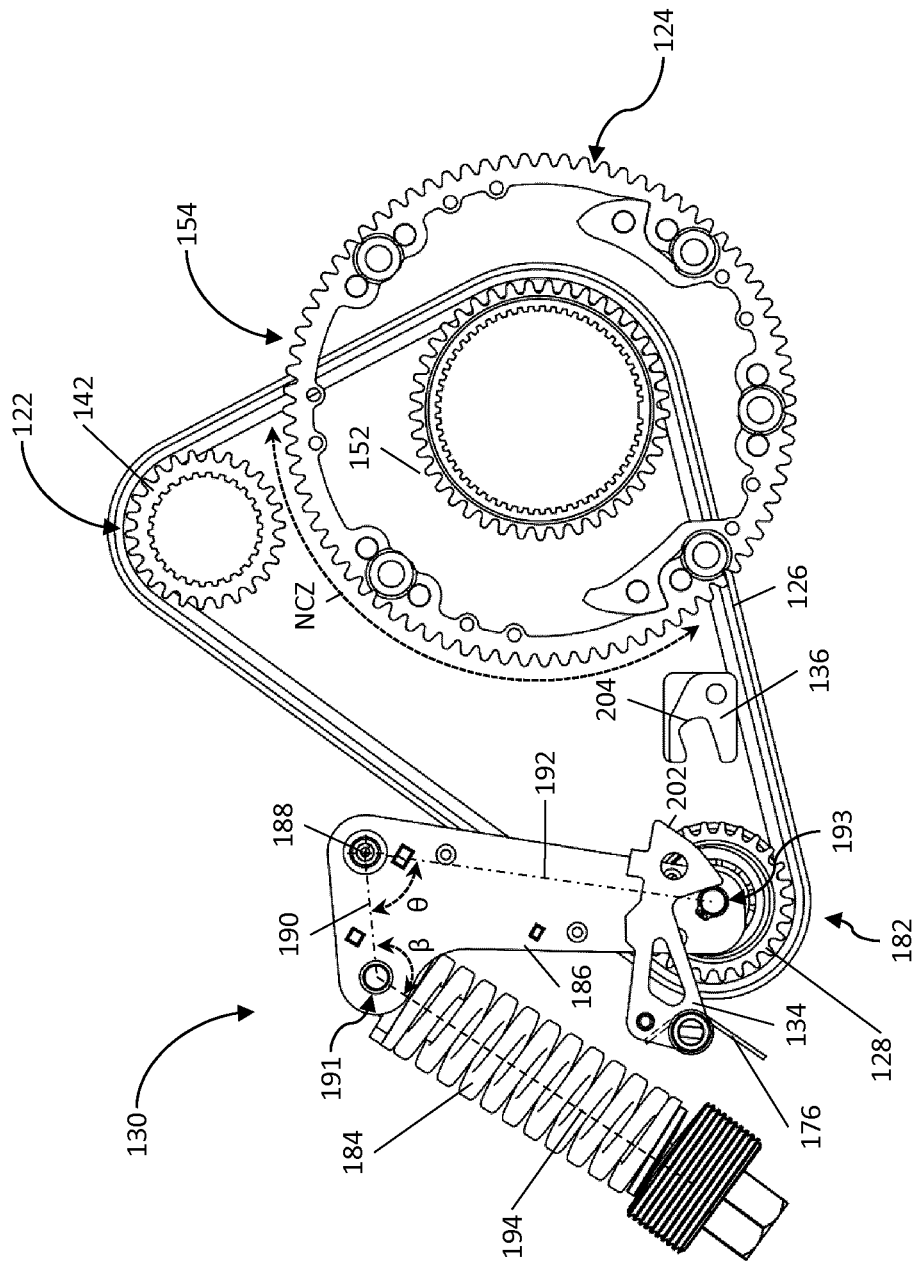
FIG. 5 is a simplified front view of the transmission of FIG. 1, in the second gear.
Figure 6:
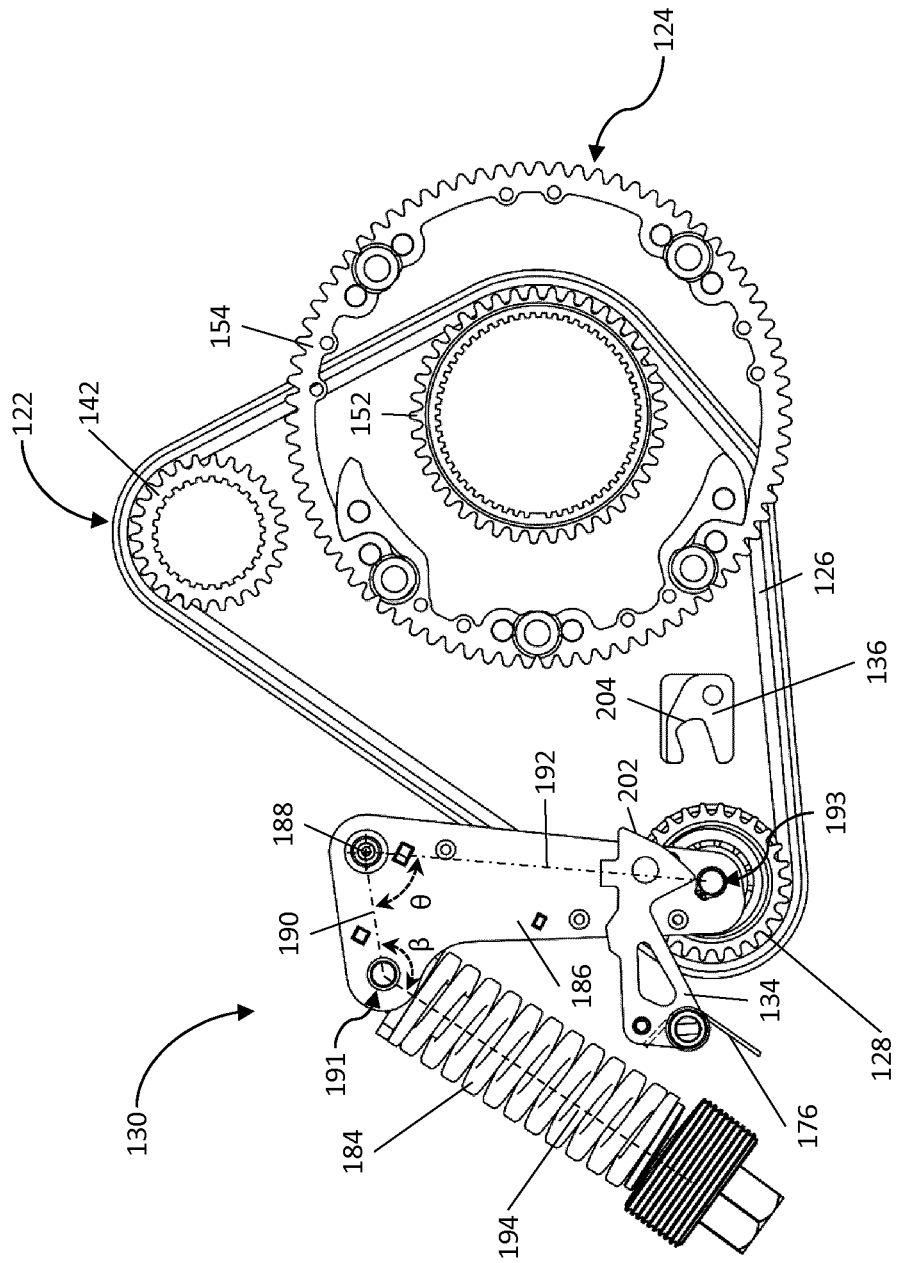
FIG. 6 is a simplified front view of the transmission of FIG. 1, in a transition from the second gear to the first gear.

As shown in FIGS. 3 to 5, the tensioner assembly 130 moves the idler pulley 128 between the first position 180 and the second position 182 as the transmission 120 shifts between the first gear and the second gear. As will be appreciated, the tensioner assembly 130 biases the idler pulley 128 towards the second position 182 during a shift from the first gear to the second gear, which moves the idler pulley 128 from the first position 180 to the second position 182 during the shift. During a shift from the second gear to the first gear, a force generated on the idler pulley 128 by the endless member 126 overcomes the bias of the tensioner assembly 130 to move the idler pulley 128 from the second position 182 to the first position 180. The movement path of the idler pulley 128 from the first position 180 to the second position 182, and vice versa, is determined by the tensioner assembly 130 based on the location of the tensioner axis 188 and the length of the idler linkage 192. Movement of the idler pulley 128 from the first position 180 to the second position 182 takes up slack in the endless member 126. Conversely, movement of the idler pulley 128 from the second position 182 to the first position 180 provides slack to the endless member 126. Accordingly, the tensioner assembly 130 can help to control tension in the endless member 126 by moving the idler pulley 128 between the first position 180 and the second position 182. In some embodiments, the tensioner assembly 130 maintains at least a minimum allowable tension in the endless member 126 as the endless member 126 transitions from engaging the segmented pulley 154 to engaging the inner pulley 152 (i.e. transitions from the first gear to the second gear), and vice versa.

Tension generated in the endless member 126 by the tensioner assembly 130 depends on a biasing force exerted by the tensioner assembly 130 on the idler pulley 128. The biasing force biases the idler pulley 128 towards the second position 182. The idler pulley 128 transmits this biasing force to the endless member 126, resulting in tension in the endless member 126. The biasing force will depend on the length of the spring linkage 190, the length of the idler linkage 192, the spring angle $\beta$ and the spring force generated by the tensioner spring 184. In the subject embodiment, the lengths of the spring linkage 190 and the idler linkage 192 are fixed. Accordingly, tension generated in the endless member 126 by the tensioner assembly 130 depends on the spring angle $\beta$ and the spring force generated by the tensioner spring 184.

The spring force generated by the tensioner spring 184 increases as the tensioner spring 184 is compressed. As shown in FIGS. 3 to 5, the tensioner spring 184 compresses as the idler pulley 128 moves from the second position 182 to the first position 180 (i.e. a counter-clockwise rotation of the tensioner arm 186 in FIGS. 3 to 5). Accordingly, if the spring angle $\beta$ were constant, the spring force generated by the tensioner spring 184 would increase as the idler pulley 128 moves from the second position 182 to the first position 180 and, resultantly, tension generated in the endless member 126 by the tensioner assembly 130 would increase as the idler pulley 128 moves from the second position 182 to the first position 180. However, it may be desirable to provide more consistent tension in the endless member 126 as the idler pulley 128 moves between the first position 180 and the second position 182 (such as during a shift event).

Accordingly, to at least partially counteract the increase in the spring force as the tensioner spring 184 compresses, the spring angle $\beta$ increases as the idler pulley 128 moves from the second position 182 to the first position 180. Increasing the spring angle $\beta$ reduces torque generated on the tensioner arm 186 by the spring force and, resultantly, acts to decrease the biasing force exerted on the idler pulley 128 by the tensioner assembly 130. By balancing the increase in the biasing force caused by the increase in the spring force with the decrease in the biasing force caused by the increase in the spring angle $\beta$, it is possible to provide generally constant tension in the endless member 126 as the idler pulley 128 moves from the second position 182 to the first position 180, and vice versa.

Stated another way, the spring angle $\beta$ approaches parallel as the idler pulley 128 moves towards the first position 180 and approaches perpendicular as the idler pulley 128 moves towards the second position 182. As described above, as the spring angle β approaches parallel, the component of the spring force that contributes to biasing the idler pulley 128 towards the second position 182 decreases. Thus, as the spring angle β approaches parallel, the component of the spring force that contributes to tension in the endless member 126 decreases. Accordingly, by changing the spring angle β as described herein, the biasing force exerted on the idler pulley 128 by the tensioner assembly 130 (and the resultant tension generated in the endless member 126) can be more consistent than if the spring angle β were constant. In some embodiments, the biasing force exerted by the tensioner assembly 130 on the idler pulley 128 (and the resultant tension generated in the endless member 126 by the tensioner assembly 130) can be generally constant as the idler pulley 128 moves between the first position 180 and the second position 182.

In some embodiment, it may be desirable to decrease tension in the endless member 126 as the idler pulley 128 moves from the second position 182 to the first position 180. In such embodiments, the tensioner assembly 130 generates higher tension in the endless member 126 when the idler pulley 128 is in the second position 182 and lower tension in the endless member 126 when the idler pulley 128 is in the first position 180. In some embodiments, the lower tension can be a minimum tension in the endless member 126. Providing minimum tension in the endless member 126 when the idler pulley 128 is in the first position 180 may improve efficiency of the transmission. Providing higher tension in the endless member 126 when the idler pulley 128 is in the second position 182 may be necessary to avoid slippage of the endless member 126. Slippage of the endless member 126 can decrease efficiency and increase noise of the transmission.

By over-compensating for the increase in the biasing force caused by the increase in the spring force with the decrease in the biasing force caused by the increase in the spring angle β, it is possible for the tensioner assembly 130 to provide decreased tension in the endless member 126 as the idler pulley 128 moves from the second position 182 to the first position 180. Stated another way, by adjusting the spring angle β such that it approaches parallel when the idler pulley 128 is in the first position 180, the tensioner assembly 130 can generate lower tension in the endless member 126 when the idler pulley 128 is in the first position 180. Similarly, by adjusting the spring angle β such that it approaches perpendicular when the idler pulley 128 is in the second position 182, the tensioner assembly 130 can generate higher tension in the endless member 126 when the idler pulley 128 is in the second position 182.

As described above, the transmission 120 comprises the idler lock 134. The idler lock 134 is movable between an unlocked position (shown in FIG. 6) and a locked position (shown in FIG. 5). The idler lock 134 secures the idler pulley 128 in the second position 182 when the idler lock 134 is in the locked position. The idler lock 134 does not secure the idler pulley 128 in the second position 182 when the idler lock 134 is in the unlocked position. The idler lock 134 comprises an idler lock spring 176 that biases the idler lock 134 towards the locked position. In the subject embodiment, the idler lock spring 176 is a torsion spring. In other embodiments, the idler lock spring may be another type of suitable spring, such as a compression spring, a coil spring or a magnetic spring. In some embodiments, the idler lock 134 may comprise an idler lock actuator (not shown) to selectively move the idler lock 134 between the locked position and the unlocked position, such as a servo motor or other suitable actuator. The idler lock 134 further comprises a locking surface 200 and a cam surface 202 (both shown in FIG. 3).

The cam surface 202 is configured to engage the idler pulley 128 as the idler pulley 128 moves from the first position 180 to the second position 182. The cam surface 202 deflects the idler lock 134 out of the locked position as the idler pulley 128 moves from the first position 180 to the second position 182. Accordingly, the idler lock 134 does not substantially resist movement of the idler pulley 128 from the first position 180 to the second position 182, even when the idler lock 134 is initially in the locked position. In some embodiments, the cam surface 202 can be extended so that contact is maintained between the cam surface 202 and the idler pulley 128 when the idler pulley 128 is in the first position 180. In some embodiments, the cam surface 202 is a ramp surface at the tip of the idler lock 134.

The locking surface 200 engages the idler pulley 128 and resists movement of the idler pulley 128 towards the first position 180, when the idler lock 134 is in the locked position and the idler pulley 128 is in the second position 182. In the subject embodiment, the locking surface 200 engages the shaft of the idler pulley 128 when in the locked position and the second position 182, respectively. The locking surface 200 does not engage the idler pulley 128 and does not resist movement of the idler pulley 128 towards the first position 180 when the idler lock 134 is in the unlocked position.

Figure 7:
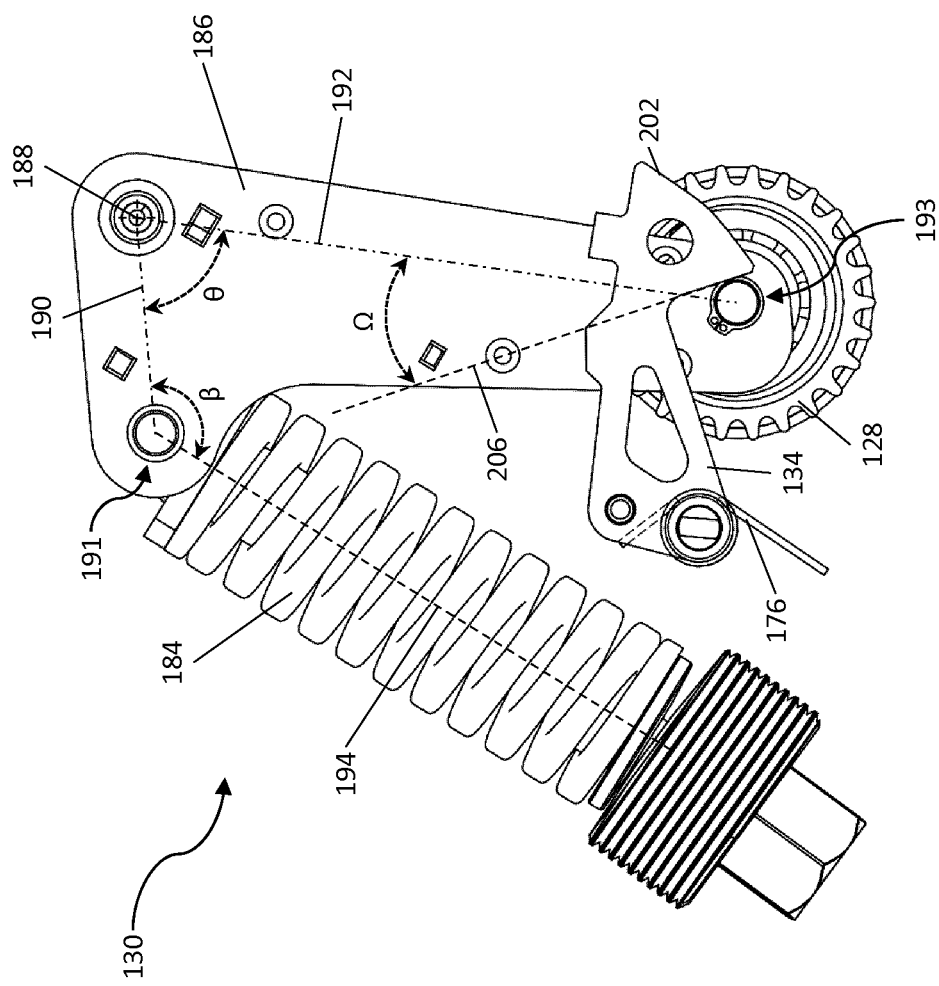
FIG. 7 is a simplified detail view of a tensioner assembly, an idler pulley and an idler lock of the transmission of FIG. 1.

In the subject embodiment, the idler lock 134 is further configured to automatically release the idler pulley 128 when tension in the endless member 126 exceeds a threshold. The idler lock 134 releases the idler pulley 128 by moving to the unlocked position when the idler pulley 128 is in the second position 182. The threshold can be a maximum allowable tension, beyond which tension in the endless member 126 is likely to cause damage to the transmission 120. As shown in FIG. 7, the locking surface 200 of the idler lock 134 is defined by a plane 206. The plane 206 is at an angle Ω from an axis defined by the idler linkage 192. The angle Ω is less than 90 degrees. In some embodiment, the angle Ω is between 10 and 45 degrees. In some embodiments, the angle Ω is between 15 and 20 degrees.

As tension in the endless member 126 increases, the idler pulley 128 is pulled towards the first position 180. When the idler lock 134 is in the locked position, the locking surface 200 resists the pull of the idler pulley 128 towards the first position, which generates an unlocking force on the locking surface 200. This unlocking force acts generally perpendicular and into the locking surface 200. As a result, a component of the unlocking force generates an unlocking torque on the idler lock 134. This unlocking torque pushes the idler lock 134 towards the unlocked position (counter-clockwise when viewed in FIG. 7). The component of the unlocking force that generates the unlocking torque is a function of the angle Ω. As the angle Ω increases, the unlocking torque generated by the unlocking force increases. The unlocking torque is resisted by the idler lock spring 176. The idler lock spring 176 generates a locking torque, based on the strength of the idler lock spring 176. This locking torque pushes the idler lock 134 towards the locked position (clockwise when viewed in FIG. 7). By adjusting the angle Ω and the strength of the idler lock spring 176, it is possible to control the unlocking force required to move the idler lock 134 from the locked position to the unlocked position. Accordingly, the idler lock 134 can be configured to automatically move to the unlocked position, and thus release the idler pulley 128, when tension in the endless member 126 reaches the threshold. Similarly, the idler lock 134 can be configured to stay in the locked position, and thus not automatically release the idler pulley 128, when tension in the endless member 126 is below the threshold. For example, the threshold can be higher than the tension expected in the endless member 126 during normal operation of the transmission 120, so that the idler lock 134 does not release the idler pulley 128 during normal operation. In some embodiments, the threshold can be higher than the tension expected in the endless member 126 during reverse operation of the transmission 120, which may be higher than the tension expected during normal operation.

As described above, the transmission 120 comprises the idler stop 136. The idler stop 136 is secured adjacent the first position 180. The idler stop 136 may be secured directly to the housing 132. The idler stop 136 is configured to arrest movement of the idler pulley 128 as the idler pulley 128 reaches the first position 180. The idler stop 136 comprises an engagement surface 204 (shown in FIG. 5) that abuts the idler pulley 128 as the idler pulley 128 reaches the first position 180. In some embodiments, the engagement surface 204 is angled to bias the idler pulley 128 away from the tensioner axis 188 of the tensioner arm 186 when the idler pulley 128 is in the first position 180. Biasing the idler pulley 128 away from the tensioner axis 188 can help to maintain a positive tension in the tensioner arm 186, which can help to prevent the tensioner arm 186 from failing by buckling during operation of the transmission 120.

Although the transmission 120 has been shown and described herein as comprising the idler lock 134 and the idler stop 136, it will be appreciated that in other embodiments the idler lock and/or the idler stop may be omitted. In some embodiments, the transmission may comprise only one of the idler lock and the idler stop.

Although the idler lock 134 has been shown and described on the transmission 120, which includes the tensioner assembly 130, it will be appreciated that in other embodiments the idler lock 134 may be provided on a transmission that does not include the tensioner assembly 130 described above. In such embodiments, the idler pulley can be moved from the first position to the second position by another suitable tensioner assembly (such as an electromagnetic, a spring, a pneumatic, a pneumatic spring, a hydraulic, and/or a mechanical actuator in conjunction with a guide for the idler pulley, such as a linear rail, a curvilinear rail, a multi-bar linkage and/or a flexible member). In some embodiment, the idler pulley can be biased towards the second position by a tensioner assembly that comprises a tensioner spring acting on the idler pulley without a tensioner arm therebetween. In such embodiments, the angle Ω is defined between the plane 206 and a plane perpendicular to an axis that extends from a center of rotation of the idler lock to a point where the idler pulley contracts the locking surface.

Although the tensioner assembly 130 has been shown and described above with a spring force that increases as the tensioner spring 184 compresses and a spring angle β that approaches parallel to counteract the increase in spring force, it will be appreciated by those skill in the art that in other embodiments the orientation of the tensioner arm 186 can be flipped, and the tensioner spring 184 can be positioned and replaced with a tensioner spring having a spring force that decreases as the tensioner spring compresses, such that the spring angle β approaches perpendicular as the tension spring compresses to counteract the decrease in spring force.

Although embodiments have been described above and are shown in the accompanying drawings, it will be appreciated by those skilled in the art that variations and modifications may be made without departing from the scope as defined by the appended claims, and the scope of the claims should be given the broadest interpretation consistent with the specification as a whole.

What is claimed is:

1. A transmission comprising:
   a first pulley assembly rotatable about a first axis;
   a second pulley assembly spaced apart from the first pulley assembly and rotatable about a second axis;
   an endless member extending between and rotationally coupling the first pulley assembly and the second pulley assembly;
   an idler pulley engaging the endless member and rotatable about an idler axis, the idler pulley being movable between at least a first position and a second position; and
   a tensioner assembly coupled to the idler pulley and configured to control tension in the endless member, the tensioner assembly comprising:
     a tensioner spring having a spring axis and biasing the idler pulley towards the second position; and
     a tensioner arm rotatable about a tensioner axis and coupling the tensioner spring to the idler pulley, the tensioner arm defining a spring linkage that extends between the tensioner axis and a spring coupling point, where the tensioner spring is coupled to the tensioner arm, and further defining an idler linkage that extends between the tensioner axis and an idler coupling point, where the idler pulley is coupled to the tensioner arm,
   wherein a spring angle is defined between the spring axis and the spring linkage,
   an idler lock that is movable between an unlocked position and a locked position,
     wherein the idler lock secures the idler pulley in the second position when the idler lock is in the locked position, and wherein the idler lock does not secure the idler pulley in the second position when the idler lock is in the unlocked position; and
     wherein the idler lock comprises a locking surface for engaging the idler pulley when the idler pulley is in the second position, and further comprises an idler lock spring that biases the idler lock towards the locked position, wherein the locking surface is defined by a plane that forms an angle (Ω) with the idler linkage, and wherein the angle (Ω) and the idler lock spring are configured to automatically release the idler pulley when tension in the endless member exceeds a threshold.

2. The transmission of claim 1, wherein the tensioner assembly is configured to provide generally constant tension in the endless member as the idler pulley moves between the second position and the first position.

3. The transmission of claim 1, wherein the tensioner assembly is configured to provide decreased tension in the endless member as the idler pulley moves from the second position to the first position.

4. The transmission of claim 1, wherein a spring force applied by the tensioner spring to the tensioner arm changes as the idler pulley moves from the second position to the first position, and wherein the spring angle changes as the idler pulley moves from the second position to the first position to at least partially counteract the change in the spring force.

5. The transmission of claim 1, wherein when the idler pulley is in the first position the spring angle is at least one of:
   i) in the range of about 150 degrees to about 185 degrees;
   ii) in the range of about 160 degrees to about 170 degrees; and
   iii) about 165 degrees; and
   wherein when the idler pulley is in the second position the spring angle is at least one of:
   i) in the range of about 110 degrees to about 140 degrees;
   ii) in the range of about 120 degrees to about 130 degrees; and
   iii) is about 125 degrees.

6. The transmission of claim 1, wherein the tensioner arm is rigid and an arm angle defined between the spring linkage and the idler linkage is fixed.

7. The transmission of claim 1, wherein the tensioner arm is generally L-shaped, wherein the idler coupling point is located at one end of the L-shape, wherein the spring coupling point is located at the other end of the L-shape, and wherein the tensioner axis is located at an elbow of the L-shape.

8. The transmission of claim 1, further comprising an idler stop to arrest movement of the idler pulley as the idler pulley reaches the first position, wherein the idler stop comprises an engagement surface that abuts the idler pulley as the idler pulley reaches the first position, and wherein the engagement surface biases the idler pulley away from the tensioner axis when the idler pulley is in the first position.

9. The transmission of claim 1, wherein a spring force applied by the tensioner spring to the tensioner arm increases as the idler pulley moves from the second position to the first position, and wherein the spring angle approaches parallel as the idler pulley moves from the second position to the first position to at least partially counteract the increase in the spring force.

10. The transmission of claim 9, wherein the spring angle approaches parallel by increasing as the idler pulley moves from the second position to the first position.

11. A transmission comprising:
   a first pulley assembly rotatable about a first axis;
   a second pulley assembly spaced apart from the first pulley assembly and rotatable about a second axis;
   an endless member extending between and rotatably coupling the first pulley assembly and the second pulley assembly;
   an idler pulley engaging the endless member and rotatable about an idler axis, the idler pulley being movable between at least a first position and a second position; and
   an idler lock that is movable between an unlocked position and a locked position, wherein the idler lock secures the idler pulley in the second position when the idler lock is in the locked position, and wherein the idler lock does not secure the idler pulley in the second position when the idler lock is in the unlocked position,
   wherein the idler lock comprises a locking surface for engaging the idler pulley when the idler pulley is in the second position, and further comprises an idler lock spring that biases the idler lock towards the locked position.

12. The transmission of claim 11, further comprising a tensioner assembly coupled to the idler pulley and configured to bias the idler pulley towards the second position.

13. The transmission of claim 11, wherein the idler lock comprises a cam surface that engages the idler pulley and deflects the idler lock out of the locked position as the idler pulley moves from the first position to the second position.

14. The transmission of claim 11, wherein the idler lock is configured to automatically release the idler pulley when tension in the endless member exceeds a threshold.

15. The transmission of claim 14, wherein the locking surface is defined by a plane at an angle ($\Omega$), and wherein the angle ($\Omega$) and the idler lock spring are configured to automatically release the idler pulley when tension in the endless member exceeds the threshold.

16. The transmission of claim 15, further comprising a tensioner assembly coupled to the idler pulley and configured to control tension in the endless member, the tensioner assembly comprising:
   a tensioner spring biasing the idler pulley towards the second position; and
   a tensioner arm rotatable about a tensioner axis and coupling the tensioner spring to the idler pulley, the tensioner arm defining a spring linkage that extends between the tensioner axis and a spring coupling point, where the tensioner spring is coupled to the tensioner arm, and further defining an idler linkage that extends between the tensioner axis and an idler coupling point, where the idler pulley is coupled to the tensioner arm.

17. The transmission of claim 16, wherein the angle ($\Omega$) is defined between the plane of the locking surface and the idler linkage.

18. A transmission comprising:
   a first pulley assembly rotatable about a first axis;
   a second pulley assembly spaced apart from the first pulley assembly and rotatable about a second axis;
   an endless member extending between and rotatably coupling the first pulley assembly and the second pulley assembly;
   an idler pulley engaging the endless member and rotatable about an idler axis, the idler pulley being movable between at least a first position and a second position; and
   an idler lock that is movable between an unlocked position and a locked position, wherein the idler lock secures the idler pulley in the second position when the idler lock is in the locked position, and wherein the idler lock does not secure the idler pulley in the second position when the idler lock is in the unlocked position,
   wherein the idler lock comprises a cam surface that engages the idler pulley and deflects the idler lock out of the locked position as the idler pulley moves from the first position to the second position.

* * * * *